INVENTORS
BRUNO SCHÄFER
FRITZ STAHLECKER

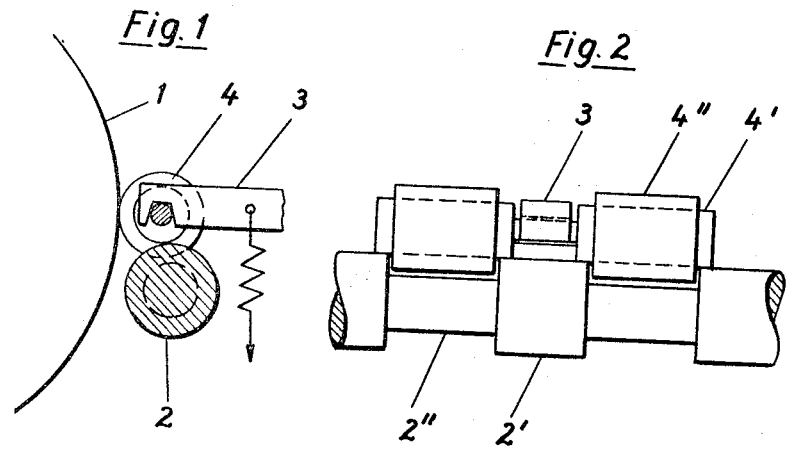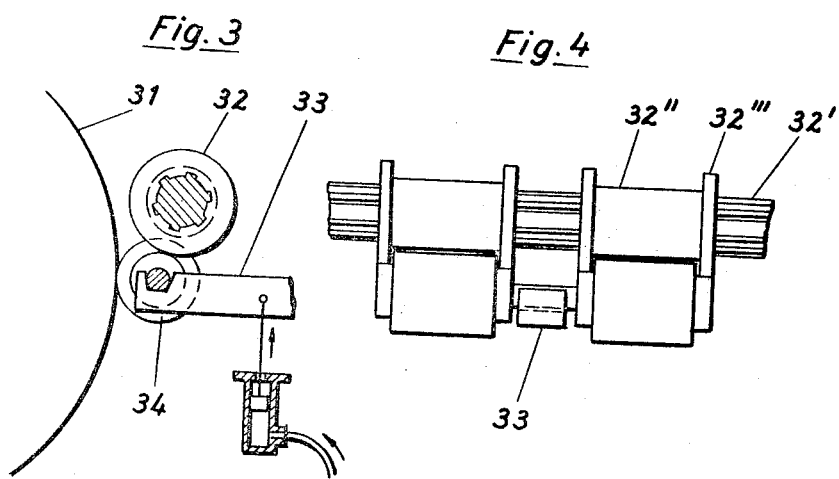

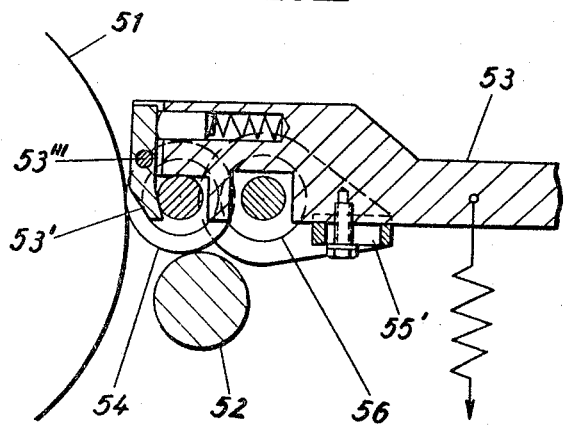
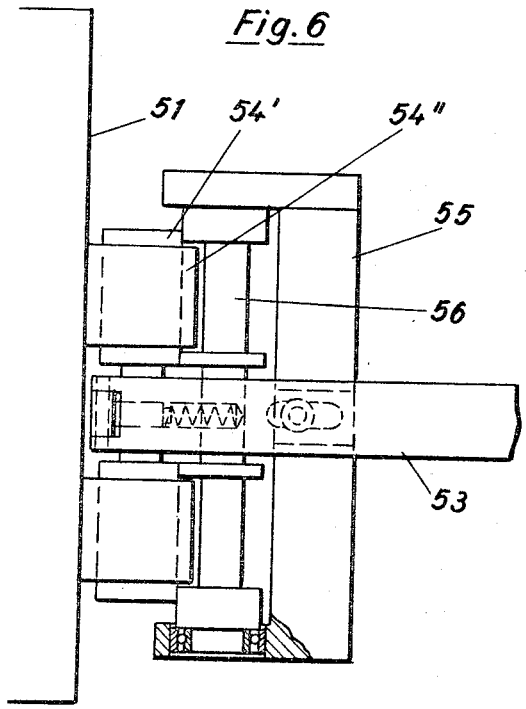

BY Dicke + Craig
ATTORNEYS

3,320,702
MECHANISM FOR GRINDING THE COVERING ON PRESSURE ROLLS MOUNTED ON ANTI-FRICTION BEARINGS
Fritz Stahlecker, Bad Uberkingen, Wurttemberg, and Bruno Schäfer, Suessen, Wurttemberg, Germany, assignors to Spindelfabrik Sussen, Schurr, Stahlecker & Grill G.m.b.H., Sussen, Wurttemberg, Germany
Filed Dec. 20, 1963, Ser. No. 335,709
Claims priority, application Germany, Dec. 22, 1962,
S 83,062
(Filed under Rule 47(a) and 35 U.S.C. 116)
16 Claims. (Cl. 51—103)

The present invention relates to a mechanism for grinding the outer surface of the covering on pressure rolls of a drawing or feed mechanism of a spinning machine in which each pressure roll may consist of one or more rollers and is rotatably mounted in anti-friction bearings and is driven by friction by a drive roll which extends parallel to and engages under pressure with the pressure roll.

In the known types of grinding mechanisms for pressure rolls, especially twin rolls, the rolls are mounted at the center on a supporting arm and are pressed by the latter with their coverings against a drive roll. The contact pressure is usually produced by a spring which acts upon the supporting arm. The grinding wheel grinds each covering individually or simultaneously on both pressure rolls along a generatrix which is radially offset at an angle of about 90° to 140° relative to the generatrix which is formed by the line of contact between the pressure roll and the drive roll. It is also already known to mount the supporting arms of such grinding apparatus laterally and so as to be adjustable in a vertical direction and to be pivotable so that the axis of the pressure roll may be adjusted so as to extend exactly parallel to the axis of the grinding wheel and to permit the pressure roll to be easily installed and removed. There is still another grinding mechanism known in which the pressure roll which is pressed with its covering upon a drive roll is pressed by an additional roll through the covering against the grinding wheel. All of these known grinding mechanisms have the disadvantage that the eccentricity, the conical or unround shape, or other irregularities of the new rough coverings on the rolls or of strongly worn coverings seriously impair the results of the grinding operation. By suitable adjusting means it has been possible to eliminate a considerable part of these influences, provided that the outer jackets of the pressure rolls which may also be formed by the outer races of anti-friction bearings are properly secured so as to extend parallel to the axis of the rolls by designing each anti-friction bearing so as to have a wide base and very little radial clearance. This applies, for example, to anti-friction bearings which are provided in two rows which are spaced relatively far from each other. If the anti-friction bearings have a narrow base, for example, in the case of two rows of balls which are spaced closely adjacent to each other or in the case of bearings with a single row of balls, the influence of the bearing clearance upon the grinding of the covering on the outer races or on outer jackets which are removably or permanently secured to the outer races cannot be eliminated. Furthermore, when the grinding operation is carried out by conventional means and no special precautions are taken, it is possible that such bearings will be subjected to excessive stresses. The strong tilting which may occur during the grinding also does not permit the radial clearance gaps of such bearings to be made very small. It has therefore already been proposed for twin rolls with one-row grooved ball bearings to provide each roll with additional bracing surfaces for bracing bearings which are arranged in the twin roll either permanently or temporarily during the grinding of the covering in such a manner that during the grinding operation the jacket on the bearing will be guided so as to be parallel to the axis as accurately as possible. It is, however, very difficult to make and manipulate such bracing surfaces and bracing bearings for twin rolls, and they also do not fulfill their purpose completely. In particular the pressure rolls which are provided with such devices are still slightly conical even though the grinding operation is carried out very carefully.

It is an object of the present invention to provide a grinding mechanism which permits the pressure rolls either in the form of single or twin rolls to be ground exactly cylindrical and true by the employment of drive rolls, even though the outer races or the outer jackets which may be permanently secured to or removable from these races are supported by a narrow base as, for example, in one-row anti-friction bearings.

According to the invention this object is attained by bracing each individual pressure roll on the drive roll or on special bracing means by means of outer surfaces on each pressure roll adjacent to its inner and outer edges and not covered by the covering to be ground. The special bracing means may be a bracing roll which at the same time serves as a drive roll. The pressure roll is therefore not driven through its covering. The grinding operation may also be carried out very satisfactorily if the pressure roll is driven in the conventional manner through its covering and is braced by a special bracing roll. The grinding mechanism may be of a very simple construction if the bracing rolls are mounted in the supporting members which are provided on the arm carrying the pressure roll. Depending upon the type of grinding machine on which the grinding mechanism is to be installed and depending upon the type of rolls, it may be advisable to press the bracing roll against the rigidly mounted pressure roll or, vice versa, to press the resiliently mounted pressure roll against the rigidly mounted bracing roll. In place of bracing rolls it is also possible to employ bracing plates. The bracing rolls may consist of one integral piece in which case they must be provided with recesses so as to provide sufficient free space for the coverings on the pressure rolls, or the bracing rolls may consist of special shafts and special bracing rollers. These shafts may be either stationary or rotatably mounted, and accordingly the rollers are then either rotatable or secured thereon. In order to permit the different types of rolls which differ by their diameter, width, and spacing to be economically ground on the same grinding mechanism, it is advisable to make the bracing rollers or individual parts thereof so as to be slidable and exchangeable. The same applies to the bracing plates which may likewise be provided with exchangeable or adjustable bracing forks or individual bracing fingers. For protecting the rolls and for attaining a proper rotation thereof during the grinding operation, it may be advisable to reinforce the bracing surfaces of the pressure rolls either at all times or during the grinding by means of rings of a special resistant material. The bracing means, that is, the bracing rolls or bracing plates may also be reinforced by such special rings or by glide shoes. It is particularly of advantage to mount the bracing roll or the bracing plate in a slide member which is slidable on the supporting arm of the pressure roll and pressed by spring means against the pressure roll, and to provide an additional quick-locking device, for example, a cam, which permits the bracing means to be pressed against or withdrawn from the pressure roll by one quick manipulation.

The features and advantages of the present invention will become more clearly apparent from the following detailed description thereof which is to be read with reference to the accompanying drawings, in which—

FIGURE 1 shows a cross section of a grinding mechanism according to the invention consisting of a grinding wheel, a drive roll, and a supporting arm for a twin roll to be ground, the two rollers of which are pressed with their uncovered outer surfaces from above against the drive roll;

FIGURE 2 shows a front view of the grinding mechanism according to FIGURE 1 but without the grinding wheel;

FIGURE 3 shows a cross section similar to FIGURE 1 of a grinding mechanism according to a modification of the invention consisting of a grinding wheel, a drive roll, and a twin roll which is pressed from below against the drive roll, and in which the drive roll consists of a splined shaft and a pair of drive rollers secured thereto so as to be adjustable in the axial direction thereon;

FIGURE 4 shows a front view of the grinding mechanism according to FIGURE 3, but without the grinding wheel;

FIGURE 5 shows a cross section of a grinding mechanism according to a further modification of the invention consisting of a grinding wheel, a drive roll, a supporting arm for a twin roll to be ground, and a supporting frame for a separate bracing roll which frame is adjustably mounted on the supporting arm, and wherein the pressure roll is pressed against the bracing roll;

FIGURE 6 shows a top view of the grinding mechanism according to FIGURE 5;

Figure 9:
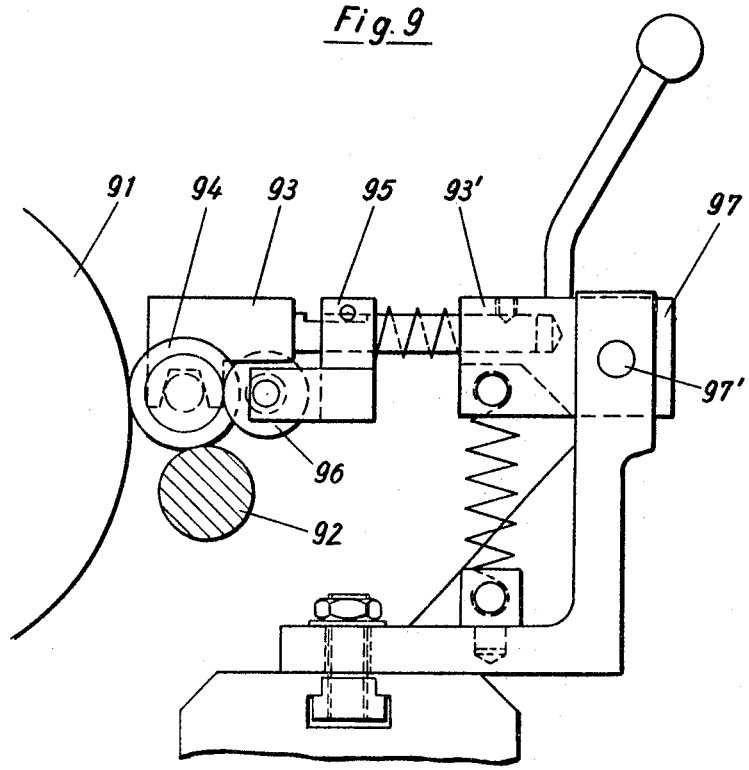
Figure 10:
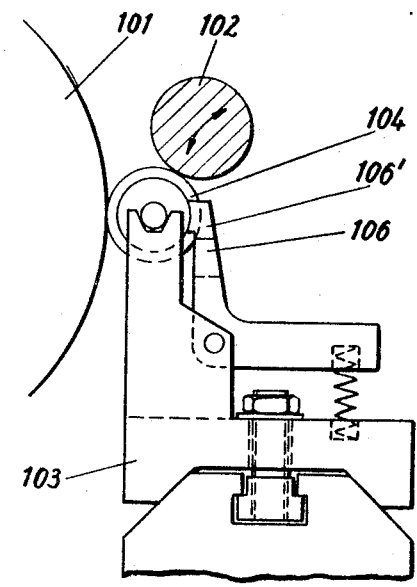
Figure 11:
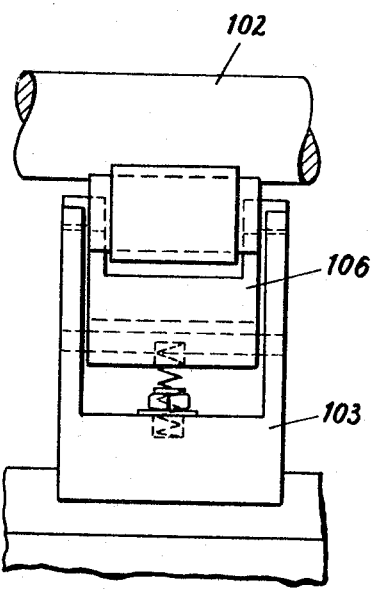
Figure 11A:
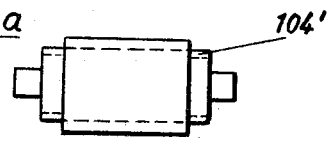
Figure 12:
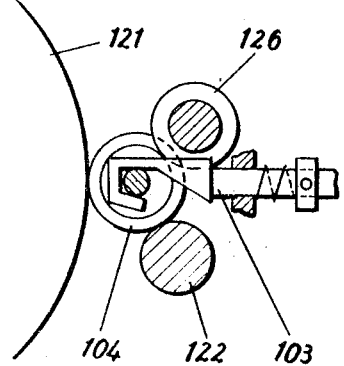
Figure 13:
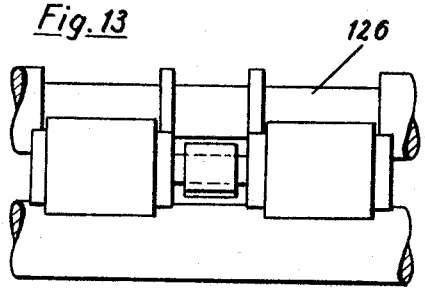
Figure 14:
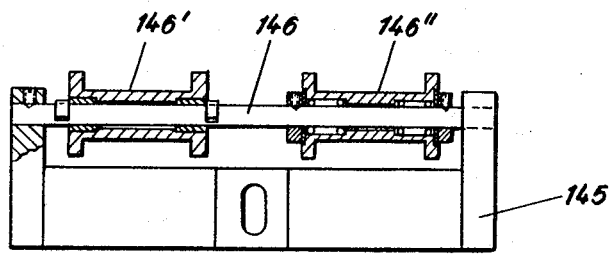
Figure 15:
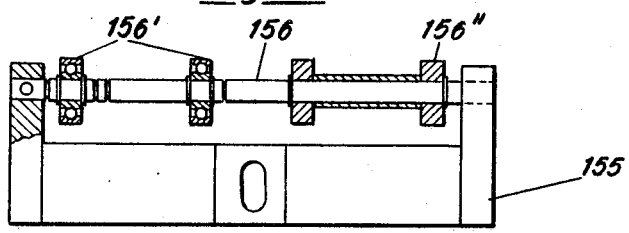
Figure 16:
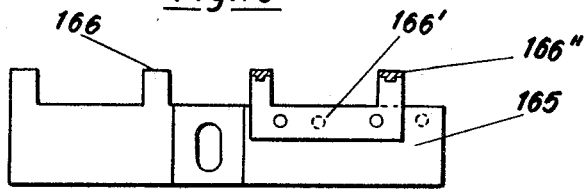

FIGURE 9 shows a side view, partly in section, of a grinding mechanism which is mounted on a support and consists of a grinding wheel, a drive roll, a supporting arm for the pressure roll, and a holder with a bracing roll thereon which is adjustably mounted on the supporting arm, and wherein the pressure roll is pressed by the bracing roll, and the supporting arm together with the holder and the bracing roll is pivotable on a bearing block which is slidable on the support;

FIGURE 10 shows a cross section of a grinding mechanism according to a further modification of the invention consisting of a grinding wheel, a bearing block for the pressure roll, a drive roll, and a bracing lever which is mounted on the bearing block and presses against the pressure roll;

FIGURE 11 shows a front view of the grinding mechanism according to FIGURE 10, but without the grinding wheel;

FIGURE 11a shows a detail view of the pressure roll of the mechanism according to FIGURE 11, but with reinforced bracing surfaces;

FIGURE 12 shows a cross section of a grinding mechanism according to a further modification of the invention consisting of a grinding wheel, a drive roll, a bracing roll, a supporting arm for carrying the pressure roll, and another arm acted upon by a spring for pressing the pressure roll against the drive roll and the bracing roll;

FIGURE 13 shows a front view of the grinding mechanism according to FIGURE 12, but without the grinding wheel;

FIGURE 14 shows, partly in section, a bracing shaft which is rigidly secured in its holder, and bracing rollers which are rotatably mounted on anti-friction bearings on the bracing shaft;

FIGURE 15 shows, partly in section, a bracing shaft which is rigidly secured in its holder, and bracing rollers which are rotatably mounted on this shaft, and wherein the rollers on the left side consist of ball bearings and those on the right side of a bushing with a pair of rollers secured thereto; while FIGURE 16 shows a bracing plate consisting of a bracing frame with bracing forks thereon, as shown at the left side of the drawing, and with bracing fingers, as shown on the right side.

FIGURES 1 and 2 of the drawings illustrate the manner in which the coverings on the pressure roll 4 which is mounted in the supporting arm 3 and are pressed against the drive roll 2 are ground by the grinding wheel 1. Pressure roll 4 is driven by its bracing surface 4' which may be a part of the jacket or of the outer race of the anti-friction bearing. The coverings 4" project into recesses 2" in the drive roll 2. The supporting arm 3 presses the pressure roll 4 by the action of a spring upon the drive roll 2.

FIGURES 3 and 4 illustrate a grinding apparatus which is similar to that as shown in FIGURES 1 and 2, except that the pressure roll 34 on the supporting arm 33 is pressed by hydraulic force against the drive roll 32 which is mounted above it. The drive roll consists of a splined shaft 32' on which the bracing rolls 32" are adjustable in the axial direction. The lateral flanges 32''' on the bracing rolls press upon the bracing surfaces of the pressure rolls.

The grinding mechanism according to FIGURES 5 and 6 is provided with a drive roll 52 which drives the pressure roll through the coverings thereon, and in addition with a bracing roll 56. By means of a lever 53' which is pivotably mounted on a pin 53''' on the supporting arm 53 and is acted upon by a spring, the bracing surfaces 54' of pressure roll 54 are pressed against the supporting roll 56 which is rotatably mounted in anti-friction bearings. Supporting arm 53 is likewise acted upon by a spring. The supporting frame 55 which carries the bracing roll 56 is mounted on the supporting arm 53 so as to be slidable in slots 55'.

Figure 7:
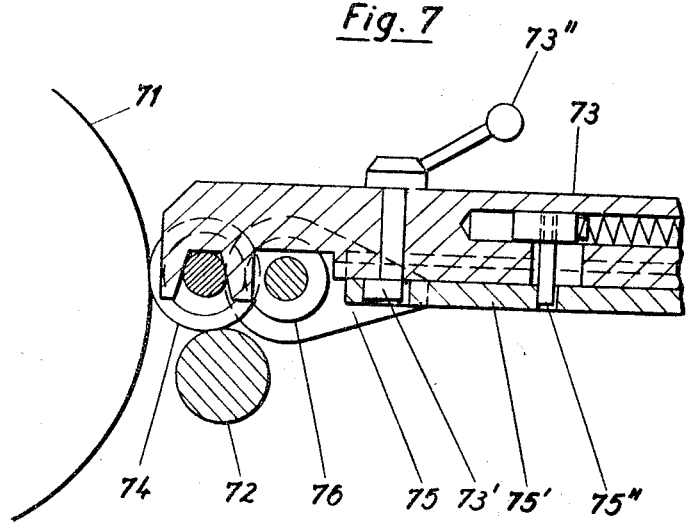
FIGURE 7 shows a cross section of a grinding mechanism according to another modification consisting of a grinding wheel, a drive roll, a supporting arm for the pressure roll, and a bracing roll which is slidable on the supporting arm by means of a slide member, and wherein the bracing roll presses against the pressure roll which is mounted on the supporting arm.
Figure 8:
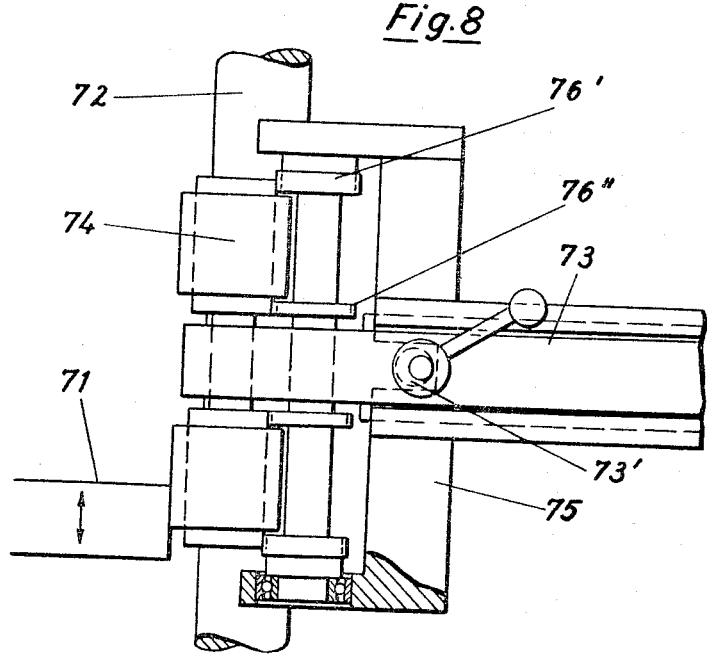
FIGURE 8 shows a top view of the grinding mechanism according to FIGURE 7.

In the grinding mechanism according to FIGURE 7, the pressure roll 74 which is driven in the usual manner through the coverings by the drive roll 72 is mounted on a supporting arm 73 in which a slide member 75' is slidable on which the supporting arm 75 of the bracing shaft 76 is secured. Slide member 75' together with the frame member 75 and the bracing shaft 76 is pressed against the pressure roll by means of a spring acting upon a piston with a pin 75" thereon. By means of a cam 73' on the end of a shaft which may be turned by a handle 73", the slide member 75' may be quickly pressed against and again be withdrawn from the pressure roll 74. The bracing roll 76 is reinforced by means of rings 76" which are made of a suitable resistant material.

In the grinding mechanism according to FIGURE 9, the supporting arm 93 for the pressure roll consists of a prismatic member which grips the shaft of the pressure roll and is mounted on a rod in a bearing member 93'. The entire supporting arm is pivotable about a pin 97' on a bearing block and is acted upon by a spring. The supporting arm 93 also carries a slide member 95 which is slidable thereon under the action of a spring and carries the bracing roll.

The grinding mechanism according to FIGURES 10 and 11 is provided with a bearing block 103 which is slidably mounted on the support of the grinding machine and carries the pressure roll 104 which is driven from above through its coverings by the drive roll 102 which is pivotably mounted on an arm, not shown. The pressure roll is supported by an angular frame 106 which is pivotably mounted on the bearing block 103 and acted upon by a spring. Frame 106 is provided with bracing shoes 106' which press upon the bracing surfaces of the pressure roller. Instead of providing the bracing frame with such bracing shoes, it is also possible to reinforce the pressure roll 104—in this case a single roll—by means of rings 104', as shown in FIGURE 11a.

The grinding mechanism according to FIGURES 12 and 13 shows a roll carrier 103 which presses the pressure roll 104 under the action of a spring against the drive roll 122 and the bracing roll 126.

FIGURES 14 and 15 show details of bracing means. The bracing roll according to FIGURE 14 is mounted in the frame 145 and consists of the shaft 146 and the bracing rollers which are rotatably mounted thereon in plain bearings or anti-friction bearings, for example, needle bearings. According to FIGURE 15, the bracing shaft 156 carries a pair of bracing rollers 156″, as shown at the right side of the drawing, which are rotatably mounted thereon and are spaced from each other and held in a fixed position in the axial direction by a spacing sleeve and lock washers. On the left part of bracing shaft 156, bracing rollers 156′ are mounted which consist of ball bearings with inner and outer races. The bracing frame 165 according to FIGURE 16 is provided at the left side of the drawing with bracing fingers 166 which may be integral with the frame and tempered. According to the modification at the right side of FIGURE 16, the bracing frame carries bracing forks 166′ which are secured thereto and the bracing fingers of which are reinforced by bracing shoes 166″ of a special resistant material. These bracing forks may be adjusted on the bracing frame or be replaced by others.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A grinding mechanism for pressure rolls of a drawing mechanism of a spinning machine, said pressure rolls having cover means and being rotatably mounted, the opposite end portions of said pressure rolls being free of said cover means and comprising outer surfaces, said grinding mechanism for said cover means comprising a grinding wheel, said wheel engaging and grinding said cover means, and a drive roll for driving said pressure roll and having an axis of rotation parallel to the axis of said pressure roll, and bracing means engaging under pressure with said outer surfaces for bracing said pressure roll.

2. A mechanism as defined in claim 1, in which said bracing means comprise a stationary shaft, at least one bracing roller, and bearing means for rotatably mounting said bracing roller on said shaft.

3. A mechanism as defined in claim 1, further comprising a supporting arm for said pressure roll, a slide member slidable on said supporting arm, said bracing means mounted on said slide member, and quick-locking means for pressing said bracing means against said outer surfaces and for withdrawing the same therefrom.

4. A mechanism as defined in claim 1, further comprising reinforcing means of a special resistant material on said bracing means for pressing against said outer surfaces.

5. A mechanism for grinding the cover means on a pressure roll of a drawing mechanism of a spinning machine, said pressure roll having exposed surface portions coaxial with said pressure roll and spaced by said cover means; said mechanism comprising a grinding wheel, a drive roll axially parallel with said pressure roll and in driving relationship therewith, and bracing means for bracing said pressure roll including engaging means supported for turning movement about a longitudinal axis parallel with the longitudinal axis of said pressure roll and comprising means adapted to engage said exposed coaxial surface portions.

6. A mechanism according to claim 5, wherein said engaging means comprises a bracing roll member.

7. A mechanism as defined in claim 5, in which said drive roll engages with said cover means for driving said pressure roll, said engaging means comprising a separate bracing roll engaging only with said exposed surfaces of said pressure roll.

8. A mechanism as defined in claim 7, further comprising an arm carrying said pressure roll, and means for supporting said bracing roll, said supporting means being secured to said arm.

9. A mechanism as defined in claim 5, further comprising spring means for pressing said engaging means against said exposed surfaces.

10. A mechanism as defined in claim 5, wherein said engaging means includes a bracing roll, and spring means for pressing said exposed coaxial surface portions of said pressure roll against said bracing roll.

11. A mechanism according to claim 6, further including supporting means for said bracing roll member comprising a pivotally mounted supporting arm, and a spring pressed slide member on said supporting arm carrying said bracing roll member.

12. A mechanism according to claim 5, further including a bearing block member, said engaging means comprising an angular frame member pivoted on said bearing block member, said means adapted to engage said coaxial surface portions being carried by said angular frame member.

13. A mechanism according to claim 12, wherein spring means is disposed between said bearing block member and said frame member for pressing said means adapted to engage said coaxial surface portions against said surface portions.

14. A mechanism according to claim 5, wherein said bracing means comprises a stationary supporting shaft, and roller members rotatably mounted on said shaft.

15. A mechanism according to claim 14, wherein said roller members are provided with flanges constituting said means adapted to engage said coaxial surface portions of said pressure roller.

16. A mechanism according to claim 6 further including a supporting arm member, a supporting frame member for said bracing roll member slidably mounted on said supporting arm member.

References Cited by the Examiner
UNITED STATES PATENTS

| | | | |
|---|---|---|---|
| 2,639,558 | 5/1953 | Cotchett et al. | 51—236 X |
| 2,719,391 | 10/1955 | Brown | 51—236 |
| 2,735,234 | 2/1956 | Swanson | 51—236 X |

LESTER M. SWINGLE, *Primary Examiner.*